(12) United States Patent
Justice et al.

(10) Patent No.: US 7,336,466 B2
(45) Date of Patent: Feb. 26, 2008

(54) CONTACTOR MATERIAL FOR WELDING WIRE FEEDER

(75) Inventors: Kenneth L. Justice, Wickliffe, OH (US); Edward A. Enyedy, Eastlake, OH (US)

(73) Assignee: Lincoln Global Inc., City of Industry, CA (US)

( * ) Notice: Subject to any disclaimer, the term of this patent is extended or adjusted under 35 U.S.C. 154(b) by 332 days.

(21) Appl. No.: 11/066,929

(22) Filed: Feb. 25, 2005

(65) Prior Publication Data

US 2006/0193098 A1 Aug. 31, 2006

(51) Int. Cl.
*H01H 73/00* (2006.01)

(52) U.S. Cl. .................................... 361/115

(58) Field of Classification Search .......... 219/121.13; 361/115
See application file for complete search history.

(56) References Cited

U.S. PATENT DOCUMENTS

| | | | | |
|---|---|---|---|---|
| 2,119,965 A | * | 6/1938 | Schwarzkopf | 420/497 |
| 4,050,930 A | * | 9/1977 | Motoyoshi et al. | 148/431 |
| 4,345,130 A | * | 8/1982 | Okutomi et al. | 200/268 |
| 4,767,913 A | * | 8/1988 | Weber et al. | 219/130.21 |
| 6,377,143 B1 | * | 4/2002 | Zhou et al. | 335/132 |
| 6,409,794 B2 | | 6/2002 | Wolmer et al. | |
| 2001/0051102 A1 | | 12/2001 | Wolmer et al. | |

* cited by examiner

*Primary Examiner*—Ronald W. Leja
(74) *Attorney, Agent, or Firm*—Fay Sharpe LLP

(57) ABSTRACT

An electromechanical contactor device is disclosed for use in a wire feeder for an electric arc welder having a power source and a gun with a contact tip through which welding wire is fed and a weld cycle start trigger switch having a closed condition to initiate and hold a weld cycle and an open condition. The contactor device comprises a power inlet lead connected to the power source, an output lead connected to the contactor tip, one or more current branches between the input lead and the output lead with a mechanical contactor having an open condition and closed condition for opening and closing the branches. A solenoid operates the contactor device based upon the condition of the trigger switch, with a first position to close the contactor when said trigger switch is shifted from the open condition to the closed condition and to hold the contactor closed when the trigger switch is in the closed condition. The contactor device utilizes one or more sets of electrical contacts formed from non-hazardous silver alloys.

23 Claims, 2 Drawing Sheets

CONTACTOR MATERIAL FOR WELDING WIRE FEEDER

The present invention relates to the art of electric arc welding and more particularly, to contactor material for an electromechanical contactor device for use in a wire feeder.

BACKGROUND OF INVENTION

In an electric arc welder, an electromechanical contactor or switch is used to direct welding power from the power source to the contact tip of the welding gun. The electromechanical contactor relies upon mechanical contacts to switch the welding current on and off, consequently, arcing at the contacts leads to degeneration of contactor performance. The degeneration of performance is exhibited as an increased contact resistance that causes an equal decrease in output power. With continued use of degraded mechanical contacts, the contactor will ultimately overheat. Such deteriorating contactors must be replaced prior to ultimate failure. If the contactor fails during an actual welding operation, the weld performed during the welding cycle may require extensive rewelding or other corrective measures.

Replacing deteriorated contacts is typically performed by replacing the electromechanical contactor device containing the deteriorated contacts. Accordingly, electromechanical contactor devices are usually in a modular form to facilitate replacement. The contactors in such devices often use a silver cadmium alloy as a contactor material. The toxic and hazardous effects of cadmium have been extensively documented. Accordingly, there exists concern over the disposal of contactor devices due to the presence of cadmium in such devices. The disposal of cadmium-containing contactor devices is of particular concern since, if a large collection of deteriorated contactor devices or modules are to be disposed, the actual cadmium content, relative to the total weight of the devices, may be relatively high. Disposal of such high proportions of cadmium may raise further issues particularly in light of future legislation against such disposals.

Accordingly, a need exists for a strategy to avoid the disposal of cadmium-containing contactor devices.

THE INVENTION

The present invention involves the use of particular contactor materials utilized in a contactor device for a wire feeder. The device employs at least one solenoid coil having one or more sets of mechanical contacts formed from these contactor materials, which contacts are opened or closed upon actuation of the solenoid.

In accordance with the invention, an electromechanical contactor device is provided for use in a wire feeder for an electric welder having a power source and a gun with a contact tip through which welding wire is fed and a weld cycle start trigger switch having a closed condition to initiate and hold a welding cycle and an open condition. The contactor device of the present invention comprises an inlet lead connected to the power source, an output lead connected to the contact tip of the gun, and one or more current branches between the input lead and the output lead. A set of mechanical contacts each having an open condition and a closed condition control electrical current in the branches. The contacts are formed from a particular non-hazardous silver alloy described herein that is free of cadmium. A solenoid is used to operate the contact sets based upon the condition of the trigger switch. The trigger switch has a first position to close the contacts when the trigger switch is closed. In this first position, the trigger switch holds the contactor closed as long as the trigger switch is in the closed condition.

In accordance with another aspect of the present invention, an electromechanical contactor device adapted for use in a wire feeder for an electric arc welder is provided. Typically, the electric arc welder has a power source and a gun with a contact tip through which welding wire is fed and a weld cycle start trigger switch having a closed condition to initiate and hold a weld cycle and an open condition. The contactor device comprises a power inlet lead connected to the power source, an output lead connected to the contact tip, a current branch between the input lead and the output lead, a mechanical contactor having an open condition and a closed condition for opening and closing the branch, respectively, and a solenoid operating the contactor based upon the condition of the trigger switch with a first position to close the contactor when the trigger switch is shifted from the open condition to the close condition and to hold the contactor closed when the trigger switch is in the closed condition. The mechanical contactor includes contacts including at least one non-hazardous silver alloy.

In accordance with another aspect of the present invention, a modular contactor device adapted for use in a welding wire feeder is provided. The contactor device comprises an enclosure defining a generally hollow interior. The contactor device also comprises a solenoid disposed in the enclosure. The solenoid includes power leads which upon energizing, actuate the solenoid. The contactor device also comprises a set of switchable contacts disposed within the enclosure. The contacts are switchable between an open state and a closed state upon actuation of the solenoid. The contactor device further comprises electrical conductors accessible from the exterior of the enclosure and in electrical communication with the set of contacts. The contacts are formed from a non-hazardous silver alloy.

The primary object of the present invention is the provision of particular contactor materials for an electromechanical contactor device for the wire feeder of an electric arc welder, which materials avoid the problems otherwise associated with cadmium and its disposal.

Another object of the present invention is the provision of a contactor device, as described herein, which device is low cost and easily implemented with commercial components.

These and other objects and advantages will become apparent from the following description taken together with the accompanying drawings.

PREFERRED EMBODIMENTS

Figure 1:
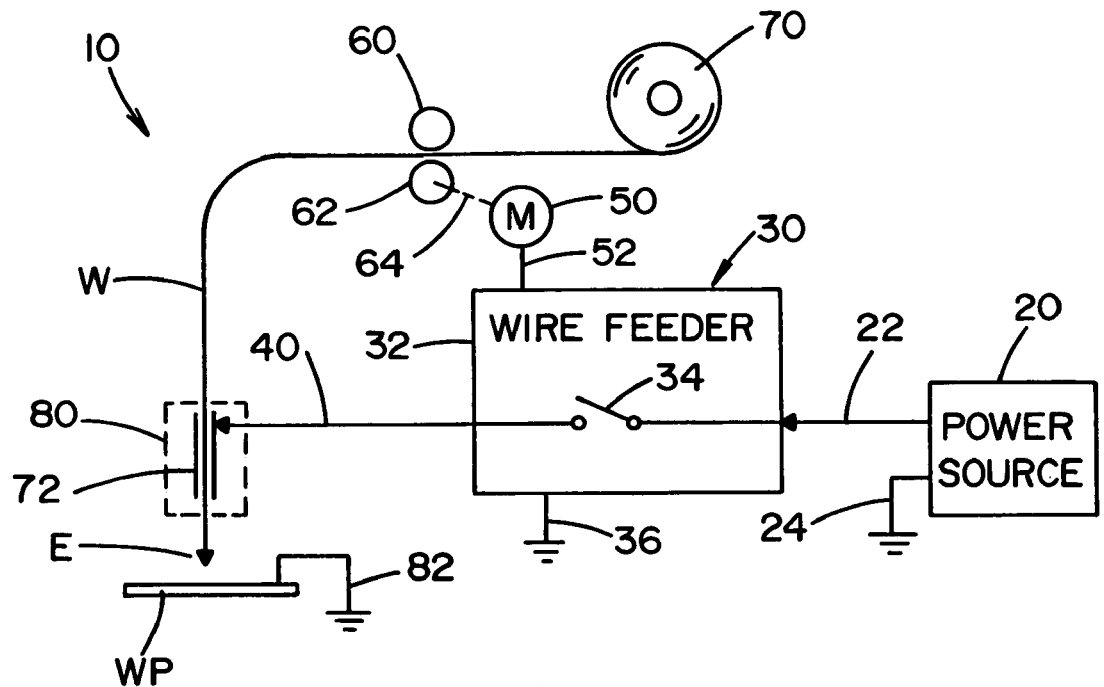
FIGS. 1 and 2 are schematic diagrams illustrating prior art electromechanical contactors in wire feeders of electric arc welders.
Figure 2:
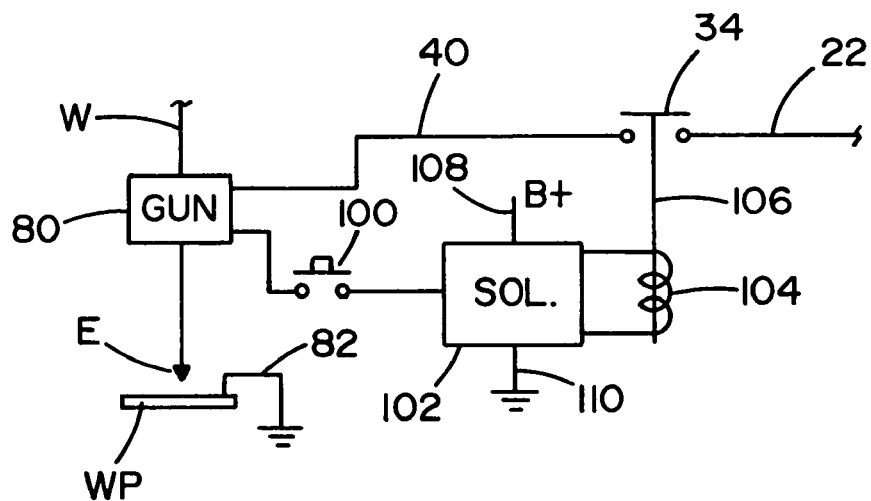

In the welding industry, a common product is an arc welder 10, as shown in FIG. 1 and schematically illustrated as including power source 20 with leads 22, 24. Wire feeder 30 enclosed in cabinet 32 has an internal electromechanical contactor 34 and a common ground 36. The wire feeder has an output welding lead 40 and a motor 50 operated at a speed determined by the signal on control line 52 from an internal microprocessor of the wire feeder. Motor 50 drives feed rolls 60, 62 through a shaft 64 to pull welding wire W from a supply, illustrated as reel or spool 70. The welding wire is moved through an electrical contact tip 72 located in welding gun 80 to direct electrode E toward workpiece WP for performing an electric arc welding process. The electrical circuit is completed by ground lead 82 attached to workpiece WP, in accordance with standard welding technology. In operation, contactor 34 is closed when a trigger switch within gun 80 is closed by an operator to drive wire W into the welding operation as welding power is directed to the contact tip. The illustration in FIG. 1 constitutes a standard welder having a wire feeder with an internal electromechanical contactor 34 operated by a solenoid in response to the position of the trigger switch associated with gun 80. Operation of switch 34 is accomplished by the components illustrated in FIG. 2 where trigger switch 100 associated with gun 80 closes solenoid 102 for creating a current flow in coil 104 to pull driver 106 downwardly for closing contactor 34. Solenoid 102 has input voltage at line 108 and ground 110 for establishing flow through coil 104 whenever switch 100 is closed. A welding cycle is started by closing trigger switch 100. This starts motor 50 and closes contactor 34. It has been found that the electromechanical contactor device illustrated in FIGS. 1 and 2 has the deficiencies so far explained.

Figure 3:
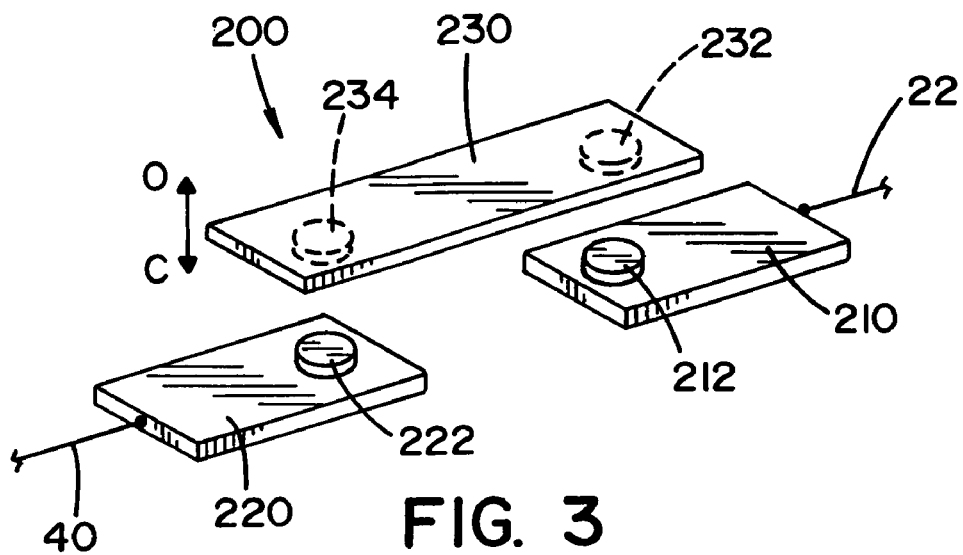
FIG. 3 is a pictorial view of a portion of a preferred embodiment electromechanical contactor device having contacts formed from particular materials in accordance with the present invention.

In accordance with the present invention, an electromechanical contactor device is still used for the wire feeder, however the device utilizes contacts formed from particular materials free of cadmium. This maintains low cost and low technology while solving the detrimental disposal consequences of known mechanical contactors based upon cadmium. Specifically, FIG. 3 illustrates a portion of a preferred embodiment contactor device 200 and specifically a collection of contacts utilized therein, in accordance with the present invention. The contactor device comprises a first member 210 which provides electrical communication with the lead 22, a second member 220 which provides electrical communication with the lead 40, and a positionable switching member 230 which provides selective electrical communication between the first and second members 210 and 220, respectively. The switching member 230 is positionable along an axis or direction shown by arrow OC. Upon being positioned to the O (open) position, the member 230 is not in electrical communication with the members 210 and 220. Upon being positioned to the C (closed) position, the member 230 is in electrical communication with the members 210 and 220. As will be appreciated by those skilled in the art, the members 210, 220, and 230 can be formed from any electrically conducting material. Additionally, it is to be understood that the present invention contactor device can utilize other switching configurations, arrangements, or geometries than that shown in FIG. 3. For example, instead of the member 230 establishing electrical communication, or preventing such communication, with both members 210 and 220, the present invention includes a switching configuration in which the member 230 is in permanent electrical communication with one of the members 210 and 220, and only switched with the other member. In addition, the contactor device 200 can include one or more mechanical bias components such as springs to urge the members to a normally open state or a normally closed state.

The contactor device 200 comprises a plurality of contacts 212, 222, 232, 234 at which electrical communication is established upon positioning the member 230 to the C or closed position. Upon closure or positioning of the member 230 to the C position, contacts 212 and 232 are placed in electrical communication with each other and contacts 222 and 234 are also placed in electrical communication with each other. Upon positioning to this state, electrical communication is established between leads 22 and 40.

The contacts are formed from a non-hazardous silver alloy. The term "non-hazardous silver alloy" as used herein specifically excludes silver alloys containing cadmium. Contacts formed from silver cadmium or silver cadmium oxide are known however, are not for use in the preferred embodiment contactors, wire feeders, and systems described herein. Cadmium is widely recognized as a toxic chemical. Disposal of contactors containing cadmium is difficult and costly and in certain instances, is not environmentally responsible. As described in detail herein, the contacts are formed from particular compositions that avoid the problems associated with cadmium and in particular, its disposal. Therefore, contactor device 200 has been found to solve the problems associated with the disposal of conventional cadmium-containing contactor devices.

As noted, the electrical contacts used in the preferred embodiment mechanical contactor device 200 are formed from a non-hazardous silver alloy. The silver alloy can be any silver alloy suitable for use in applications involving typical current and voltage levels associated with wire feeders. The silver alloy selected exhibits high conductivity, is oxidation resistant, and possesses arc-resistant and anti-welding characteristics. Preferably, the silver alloy can be for example silver tin oxide, silver tungsten, silver tungsten carbide, silver molybdenum, silver graphite or silver nickel. In a particularly preferred aspect of the present invention, the contacts are formed from silver tin oxide due to its long life, availability, and low cost.

The preferred embodiment contacts can be formed entirely of the noted silver alloy or formed from mixtures or discrete agglomerations of the noted alloys. Moreover, the contacts can be formed from a solid piece or region of the noted silver alloy, or can be made using a thin outer layer of the noted silver alloy.

Figure 4:
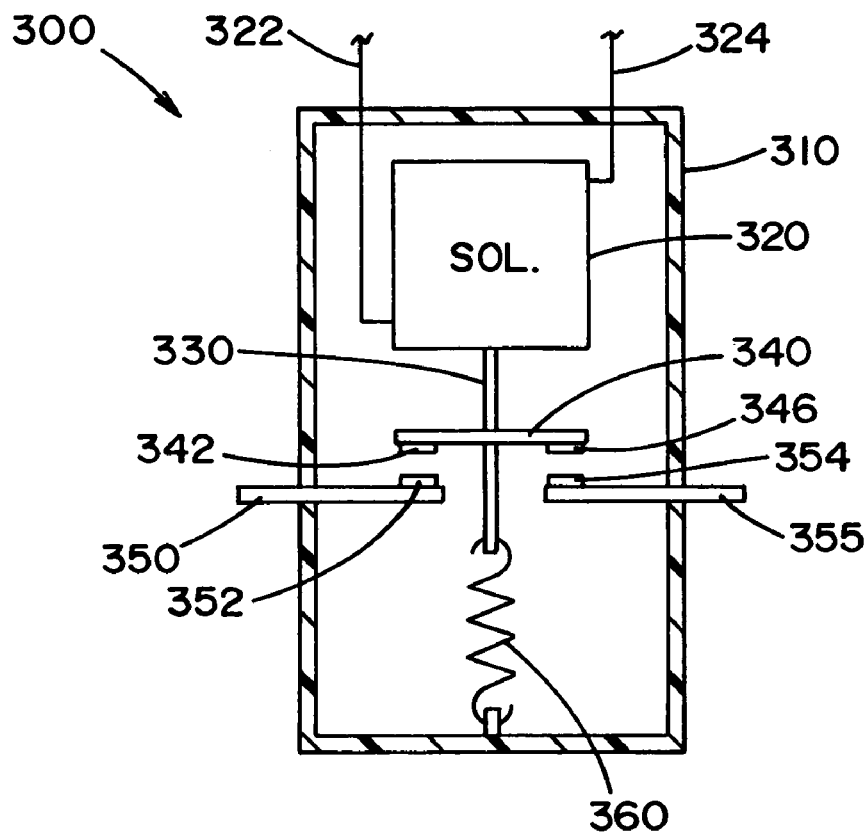
FIG. 4 is a schematic view of a preferred embodiment modular contactor device in accordance with the present invention.

As noted, the preferred embodiment contactor device is in a module form such that it can easily be replaced. FIG. 4 illustrates a preferred embodiment modular contactor device 300. The preferred embodiment contactor device 300 comprises a solenoid 320 disposed within an enclosure 310. The enclosure defines a hollow interior and preferably provides protection from the environment or external factors. The solenoid 320 includes power leads 322 and 324. As will be appreciated, these leads supply a low voltage current such as a 12 volt direct current to the solenoid for its operation. The solenoid 320 operates a switching assembly generally including a member 340 which upon operation of the solenoid 320 places electrical conductors 350 and 355 in electrical communication with each other. Specifically, the member 340 includes electrical contactors 342 and 346. The electrical conductor 350 includes a contact 352. And, the electrical conductor 355 includes a contact 354. A spring or other mechanical bias component 360 is preferably included in the enclosure 310 to maintain a desired position between the member 340 and the electrical conductors 350 and 355. The contacts 342, 346, 352, and 354 are formed from one or more non-hazardous silver alloys. In the embodiment illustrated in FIG. 4, the return spring 360 biases the member 340 in an open position. However, the present invention includes modules having switching members or contacts configured in a normally closed state. In addition to, or instead of, springs, the modular device 300 can utilize other types of mechanical bias components to urge the members and contacts in a desired state. The distal ends of the electrical conductors 350 and 355 can include apertures or other components for facilitating mounting of the enclosure 310 on a hardware board or within a wire feed enclosure as is known in the art. The preferred embodiment module 300 is generally self-contained and can be readily replaced with another comparable module.

The present invention includes electromechanical contactor devices that utilize switching members which are themselves formed from one or more of the non-hazardous silver alloys described herein. For example, member 210, 220, and 230 of device 200 partially depicted in FIG. 3 could be formed entirely from, or include an outer layer of, one or more of the silver alloys noted herein. Forming members 210, 220, and 230 in this fashion could avoid the need for separate contacts on each member such as 212, 222, 232, and 234. Similarly, such a strategy could be implemented for the modular contactor device 300 illustrated in FIG. 4.

The foregoing description is, at present, considered to be the preferred embodiments of the present invention. However, it is contemplated that various changes and modifications apparent to those skilled in the art, may be made without departing from the present invention. Therefore, the foregoing description is intended to cover all such changes and modifications encompassed within the spirit and scope of the present invention, including all equivalent aspects.

Having thus defined the invention, the following is claimed:

1. An electromechanical contactor device in a wire feeder for an electric arc welder having a power source and a gun with a contact tip through which welding wire is fed and a weld cycle start trigger switch having a closed condition to initiate and hold a weld cycle and an open condition, said contactor device comprising:
   a power inlet lead connected to said power source;
   an output lead connected to said contact tip;
   one or more current branches between said input lead and said output lead with a mechanical contactor having an open condition and closed condition for opening and closing each of said branches, respectively; and
   a solenoid operating said contactor based upon the condition of said trigger switch, with a first position to close said contactor when said trigger switch is shifted from said open condition to said closed condition and to hold said contactor closed when said trigger switch is in said closed condition,
   wherein the contactor includes electrical contacts formed from a non-hazardous silver alloy.

2. The electromechanical contactor device of claim 1 wherein the silver alloy is silver tin oxide.

3. The electromechanical contactor device of claim 1 wherein the silver alloy is silver tungsten.

4. The electromechanical contactor device of claim 1 wherein the silver alloy is silver tungsten carbide.

5. The electromechanical contactor device of claim 1 wherein the silver alloy is silver molybdenum.

6. The electromechanical contactor device of claim 1 wherein the silver alloy is silver graphite.

7. The electromechanical contactor device of claim 1 wherein the silver alloy is silver nickel.

8. The electromechanical contactor device of claim 1 wherein the contact is comprised entirely of a non-hazardous silver alloy.

9. The electromechanical contactor device of claim 1 wherein the contact includes a thin layer of a non-hazardous silver alloy.

10. The electromechanical contactor device of claim 1 wherein the contact comprises at least two non-hazardous silver alloys.

11. An electromechanical contactor device adapted for use in a wire feeder for an electric arc welder having a power source and a gun with a contact tip through which welding wire is fed and a weld cycle start trigger switch having a closed condition to initiate and hold a weld cycle and an open condition, said contactor device comprising:
   a power inlet lead connected to said power source;
   an output lead connected to said contact tip;
   a current branch between said input lead and said output lead;
   a mechanical contactor having an open condition and a closed condition for opening and closing said branch, respectively;
   a solenoid operating said contactor based upon the condition of said trigger switch with a first position to close said contactor when said trigger switch is shifted from said open condition to said closed condition and to hold said contactor closed when said trigger switch is in said closed condition;
   wherein the mechanical contactor includes contacts comprising at least one non-hazardous silver alloy.

12. The electromechanical contactor device of claim 11 wherein the silver alloy is silver tin oxide.

13. The electromechanical contactor device of claim 11 wherein the silver alloy is silver tungsten.

14. The electromechanical contactor device of claim 11 wherein the silver alloy is silver tungsten carbide.

15. The electromechanical contactor device of claim 11 wherein the silver alloy is silver molybdenum.

16. The electromechanical contactor device of claim 11 wherein the silver alloy is silver graphite.

17. The electromechanical contactor device of claim 11 wherein the silver alloy is silver nickel.

18. The electromechanical contactor device of claim 11 wherein the contact is made entirely from the non-hazardous silver alloy.

19. The electromechanical contactor device of claim 11 wherein the contact includes a thin layer of the non-hazardous silver alloy.

20. A modular contactor device adapted for use in a welding wire feeder, the contactor device comprising:
   an enclosure defining a generally hollow interior;
   a solenoid disposed in the enclosure, the solenoid including power leads which upon energizing, actuate the solenoid;
   a set of switchable contacts disposed within the enclosure, the contacts being switchable between an open state and a closed state upon actuation of the solenoid;
   electrical conductors accessible from the exterior of the enclosure and in electrical communication with the set of contacts;
   wherein the contacts are formed from a non-hazardous silver alloy.

21. The modular contactor device of claim 20 further comprising:
   a mechanical bias component disposed in the enclosure, the bias component urging the contacts in a normally open state.

22. The modular contactor device of claim 20 further comprising:

a mechanical bias component disposed in the enclosure, the bias component urging the contacts in a normally closed state.

23. The modular contactor device of claim 20 wherein the non-hazardous silver alloy is selected from the group consisting of silver tin oxide, silver tungsten, silver tungsten carbide, silver molybdenum, silver graphite, silver nickel, and combinations thereof.

* * * * *